US 9,384,188 B1

(12) United States Patent
Levit et al.

(10) Patent No.: US 9,384,188 B1
(45) Date of Patent: Jul. 5, 2016

(54) TRANSCRIPTION CORRECTION USING MULTI-TOKEN STRUCTURES

(71) Applicant: Microsoft Technology Licensing, LLC, Redmond, WA (US)

(72) Inventors: Michael Levit, San Jose, CA (US); Umut Ozertem, San Carlos, CA (US); Sarangarajan Parthasarathy, Mountain View, CA (US); Padma Varadharajan, Palo Alto, CA (US); Karthik Raghunathan, Sunnyvale, CA (US); Issac Alphonso, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/606,706

(22) Filed: Jan. 27, 2015

(51) Int. Cl.
*G10L 15/04* (2013.01)
*G06F 17/27* (2006.01)
*G10L 15/02* (2006.01)

(52) U.S. Cl.
CPC .............. *G06F 17/277* (2013.01); *G10L 15/02* (2013.01)

(58) Field of Classification Search
CPC ..... G10L 15/06; G10L 15/063; G10L 15/187; G10L 15/30; G10L 15/14; G10L 15/32
USPC ....... 704/254, 256, 270.1, E15.047, E17.002, 704/2, 235, 243, 355, 256.02, E15.007, 704/E15.02; 379/88.07, 218.01, 67.1, 379/88.01, 88.08, 88.13, 88.21, 93.12; 382/187, 161, 203, 226, 229
See application file for complete search history.

(56) References Cited

U.S. PATENT DOCUMENTS

| | | | |
|---|---|---|---|
| 6,501,833 B2 * | 12/2002 | Phillips | ................. G10L 15/187 379/218.01 |
| 7,162,423 B2 | 1/2007 | Thrasher et al. | |
| 8,386,264 B2 | 2/2013 | Hori et al. | |
| 8,401,847 B2 | 3/2013 | Ogata et al. | |
| 8,494,852 B2 | 7/2013 | LeBeau et al. | |
| 2002/0052742 A1 | 5/2002 | Thrasher et al. | |
| 2007/0208567 A1 | 9/2007 | Amento et al. | |

(Continued)

FOREIGN PATENT DOCUMENTS

WO    2007101089 A1    9/2007

OTHER PUBLICATIONS

Rosti, et al., "Confusion Network Decoding for MT system Combination", In Proceedings of Handbook of Natural Language Processing and Machine Translation, Mar. 24, 2012, 29 pages.

(Continued)

*Primary Examiner* — Charlotte M Baker
(74) *Attorney, Agent, or Firm* — Tom Wong; Steven Spellman; Micky Minhas

(57) ABSTRACT

Examples of the present disclosure describe generation of a multi-arc confusion network to improve, for example, an ability to return alternatives to output generated. A confusion network comprising token representations of lexicalized hypotheses and normalized hypotheses is generated. Each arc of the confusion network represents a token of a lexicalized hypothesis or a normalized hypothesis. The confusion network is transformed into a multi-arc confusion network, wherein the transforming comprising realigning at least one token of the confusion network to span multiple arcs of the confusion network. Other examples are also described.

20 Claims, 8 Drawing Sheets

(56) References Cited

U.S. PATENT DOCUMENTS

2012/0259627 A1   10/2012   Willett et al.
2014/0195238 A1    7/2014   Terao et al.

OTHER PUBLICATIONS

Rosti, et al., "BBN System Description for WMT10 System Combination Task", In Proceedings of the Joint 5th Workshop on Statistical Machine Translation and Metrics, Jul. 15, 2010, 6 pages.

Feng, et al., "Effects of Word Confusion Networks on Voice Search", In Proceedings of the 12th Conference of the European Chapter of the Association for Computational Linguistics, Apr. 3, 2009, 8 pages.

Tur, et al., "Improving Spoken Language Understanding Using Word Confusion Networks", In Proceedings of the 7th International Conference on Spoken Language Processing, Sep. 16, 2002, 4 pages.

Tur, et al., "Semantic Parsing Using Word Confusion Networks with Conditional Random Fields", In Proceedings of 14th Annual Conference of the International Speech Communication, Aug. 25, 2013, 5 pages.

"Confusion Networks Decoding", Published on: Apr. 20, 2011, Available at: http://www.statmt.org/moses/?n=Moses.Confusion-Networks.

Hakkani-Tur, et al., "Beyond ASR 1-best: Using word confusion networks in spoken language understanding", In Proceedings of Computer Speech & Language, vol. 20, Issue 4, Oct. 2006, 20 pages.

Xu, et al., "Word-based Probabilistic Phonetic Retrieval for Low-resource Spoken Term Detection", Sep. 14, 2014, 5 pages.

International Search Report and Written Opinion Issued in PCT Application No. PCT/US2016/014411, Apr. 12, 2016, 14 Pages.

Marin, et al., "Using Syntactic and Confusion Network Structure for Out-of-Vocabulary Word Detection", In Proceedings of the IEEE Spoken Language Technology Workshop, Dec. 2, 2012, pp. 159-164.

Ogata, et al., "Speech Repair: Quick Error Correction Just by Using Selection Operation for Speech Input Interfaces", In Proceedings of Interspeech: Eurospeech, 9th European Conference on Speech Communication and Technology, Sep. 4, 2005, pp. 133-136.

* cited by examiner

400

TRANSCRIPTION CORRECTION USING MULTI-TOKEN STRUCTURES

BACKGROUND

Advances in automated speech recognition (ASR), has led to increasing interest in spoken language understanding (SLU). A challenge in large vocabulary spoken language understanding is robustness to compensate for ASR errors. Speech recognition is not perfect, and every user understands that occasional recognition mistakes are a fact of life. From a user's perspective, easiness of correction of recognition mistakes has a substantial impact on an overall experience of a user when speech recognition applications or programs are used. It is with respect to this general technical environment that the present application is directed.

SUMMARY

Examples of the present disclosure describe generation of a multi-arc confusion network to improve, for example, an ability to return alternatives to output generated. A confusion network comprising token representations of lexicalized hypotheses and normalized hypotheses is generated. Each arc of the confusion network represents a token of a lexicalized hypothesis or a normalized hypothesis. The confusion network is transformed into a multi-arc confusion network, wherein the transforming comprising realigning at least one token of the confusion network to span multiple arcs of the confusion network. Other examples are also described.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Approaches to correct speech recognition mistakes may use word confusion networks that can offer alternatives for some words once the user indicates that that a hypothesis (e.g., result) provided to the user was not the result the user intended. However, commonly, a word confusion network (WCN) does not address the issue of alternatives or corrections spanning several words or nodes of a WCN. An additional challenge comes from the fact that speech recognition happens at the lexical level and thus WCNs are produced at a lexical level where text presented to a user contains tokens that are the result of text normalization on lexical outputs. Accordingly, common WCNs may struggle with handling corrections in the presence of altering words associated with a spoken utterance.

Examples of the present disclosure describe generation of a multi-arc token-level confusion network representing hypotheses of recognition results for a spoken utterance to improve an ability to return alternatives to a user for token representations presented to the user. The generated multi-arc confusion network comprises token representations resulting from normalization of lexicalized hypotheses. Additionally, the generated multi-arc token-level confusion network is a weighted token-level confusion network with arcs spanning multiples nodes to improve processing in returning alternatives to the user.

For example, when results are returned to a user in response to a spoken utterance, the user may indicate that the output presented is not what the user was looking for or the user may simply request an alternative to an element or token presented in an output. Weighted token-level multi-arc confusion networks of the present application are usable to accurately and efficiently return alternatives to the user as it makes obvious alternatives that are available for any selected/identified node span. A number of technical advantages are achieved based on the present disclosure including increased efficiency and accuracy in speech recognition processing, increased efficiency and accuracy in processing of alternatives for a user, reduced processing load for follow-up queries from user, increased processing speed, reduction in error rate for speech recognition and improved user interaction performance, among the other plurality of technical advantages.

Figure 1:
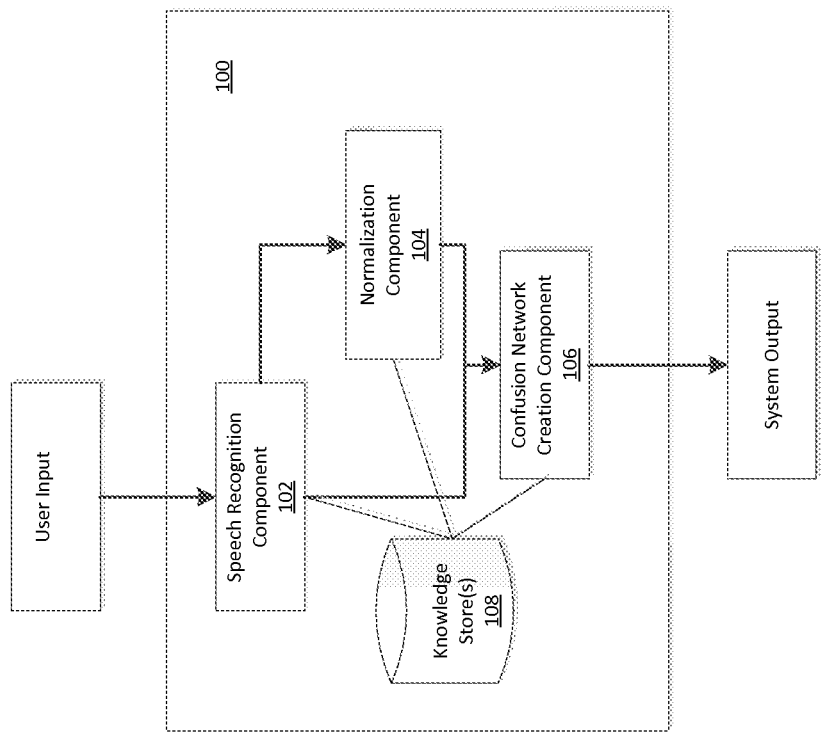
FIG. 1 illustrates an overview of example systems for input recognition and processing.

FIG. 1 illustrates an overview of example system 100 for input recognition and processing. Exemplary system 100 presented is a combination of interdependent components that interact to form an integrated whole for execution of input understanding and processing. Components of the systems may be hardware components or software implemented on hardware components of the systems. In examples, system 100 may include any of hardware components (operating system (OS)), software components (e.g., applications, application programming interfaces, virtual machines) running on hardware components, runtime libraries. In one example, an exemplary system may provide an environment for software components to run, obey constraints set for operating, and makes use of resources or facilities of the system 100, where components may be software (e.g., application, program, module, etc.) running on one or more processing devices. For instance, an input understanding application or service may be run on a processing device such as a computer, mobile phone, tablet, gaming console, electronic devices, etc., where components of the system may be executed on the processing device. In other examples, components of example systems may be spread across multiple devices. For instance, input may be entered on a client device (e.g., mobile phone) and information may be processed or accessed from other devices in a network such as a server device and/or data store. System 100 also includes components such as data storages/memory/stores, for example a knowledge store 108 shown in FIG. 1 and described below. Each component may comprise one or more system components. Please refer to FIGS. 5-7 for additional examples of hardware that may be included as part of the exemplary systems.

As one example, the system 100 includes components such as a speech recognition component 102, a normalization component 104, a confusion network creation component 106 and a knowledge store 108, each having one or more additional components. The scale of systems such as system 100 may vary and include more or less components than those described in FIG. 1. Interfacing between components of the system 100 occurs through a network connecting components of a system and/or resources external to a system. In one example, components of system 100 exist locally on a device such as a mobile device. In at least one other example, components of the system 100 may be connected through a distributed environment such as a cloud computing environment.

Components of exemplary systems interface with an OS of a processing device to allow input understanding and processing including a user interface (UI) for entering an input and receiving a response. For example, system 100 may receive input from a client (e.g., user or service). Components of the exemplary system 100 are used to capture and process input and generate and/or update a token confusion network (e.g., to create a multi-arc token confusion network). As an example, system 100 may operate as an intelligent personal assistant. An intelligent personal assistant is a mobile software agent that can perform tasks, or services, for an individual based on user input, location awareness, and the ability to access information from a variety of online sources. Examples of intelligent personal assistants that the system 100 may operate with include but are not limited to SILVIA, S-Voice, Voice Mate, Google Now, Cortana, Hidi and Siri, among other examples.

Exemplary system 100 comprises a speech recognition component 102 that is used to capture, process and transcribe a captured input. As an example, the speech recognition component 102 is able to process spoken queries into text. Examples of the speech recognition component 102 include but are not limited to: an automatic speech recognition (ASR), computer speech recognition, or speech to text (STT), among other examples. The speech recognition components 102 may interface with an OS of a processing device to provide a user interface for a user to enter input. The speech recognition component 102 runs speech recognition on a captured input. Speech recognition processing transcribes a received input, for example a speech input, into a lexical recognition result or hypothesis by analyzing an electrical signal (e.g., speech signal) and generating one or more (n-best) results. The speech recognition component 102 may utilize the knowledge store 108 when analyzing a captured signal to improve robustness of speech recognition processing to generate the lexical recognition results. Lexicalized models are applied to an input signal so that the speech recognition component 102 generates lexicalized results/hypotheses. For instance, the speech recognition component 102 may transform a captured input signal into a sequence of one or more elements. An element is a unit associated with vocabulary such as a letter, symbol, character, word, etc. An example of a lexicalized recognition result is "find the closest seven eleven store." In addition to transforming a signal into a lexicalized result, the speech recognition component 102 assigns a score or weight to one or more elements of a lexicalized result. As an example, a score may be associated with an acoustic score for a lexicalized element where the score assesses a probability that the speech signal represents this lexicalized element or with a language model score that assesses a probability that one lexicalized element follows other lexicalized elements. Using the above lexical result, a score may be assigned to one or more elements of "find the closest seven eleven store," where the speech recognition component 102 assesses the probability that it accurately interpreted the lexical result. In the case of n-best recognition results, each of the results are provided with a separate score derived from the scores of the lexicalized elements it contains.

The speech component 102 also interfaces directly with the confusion network creation component 106 for output of generated confusion networks and multi-arc confusion networks. In a first processing operation, a confusion network or multi-arc confusion network is generated. In another processing operation, an input is received where a user requests an alternative for a token of a result returned to a user. In that example, system 100 processes the request from the user and identifies (e.g., using the speech recognition component 102) that a user would like an alternative representation of one or more tokens identified by the user. System 100 outputs alternatives to the user based on evaluation of the multi-arc confusion network. Thus, a request for alternatives can be provided directly to the confusion network creation component 106 to identify and output alternatives to a system user. In other examples, output of alternative is triggered by a decision of system 100 rather than a request for alternatives from a user.

Additionally, the speech recognition component 102 interfaces with one or more knowledge components such as knowledge store 108. Knowledge store 108 is a resource that increases an amount of information that an exemplary system possesses, such as system 100, so that it can make more informed decisions at a given point in time. Knowledge store 108 stores any structured and unstructured information that is usable by components of system 100 such as the speech recognition component 102, the normalization component 104 and the confusion network creation component 106 to enhance execution of processing. An example of information stored by the knowledge store 108 is knowledge data being any data that enhances robustness of an exemplary system or is able to be applied to improve processing by a component of an exemplary system. Examples of knowledge data stored by knowledge store 108 include but are not limited to: definitions, information for input understanding and transcription, lexical and grapho-phonetical information, rules, name data, historical data (including data from previous queries), inter-relationships between components of systems, restrictions (e.g. formal stated descriptions of truth for evaluating data), classes (e.g., collections, concepts, programming types), attribute data (e.g., properties, features, characteristics, parameters), axioms, modeling data including language models, adapted language models, normalization models, token-level modeling, statistical data, event and functional term information, usage patterns, word associations, contextual information, among other examples. The knowledge store 108 may also communicate with components or resources outside of exemplary systems in order to gather or collect information relevant to performing processing and making a best possible decision as to how systems such as system 100 may respond to an input or a request for alternative output. As examples, the knowledge store 108 may be linked to network resources over the Internet, for example search engines (e.g., Bing, Google Search, Yahoo Search, Ask, WebCrawler, Dogpile, etc.).

A normalization component 104 interfaces with the speech recognition component 102 to generate normalized results for each lexicalized result generated by the speech recognition component 102. The normalization component 104 performs text normalization (e.g., inverse text normalization (ITN)) to a lexicalized result transforming the text of a lexicalized result into a canonical form that a person would write or express (e.g., a readable representation). As an example, a readable representation of an input of "seven eleven" is "7-11." The normalization component 104 converts each of the n-best recognition alternatives from lexicalized level to token level. Each normalized result/hypotheses comprises one or more tokens. A token is a unit of communication that is a result of normalization of a lexical element expressing how an output would be presented to a user (e.g., word or alpha-numeric expression).

In some examples, the normalization component 104 identifies that a lexicalized result/hypothesis does not require changing. In that case, normalization of a lexicalized result keeps a same lexical representation of a hypothesis as was created by the speech recognition component 102. That is, elements of lexicalized results are the tokens for generation of a confusion network. In the example where a hypothesis/result is "find the closest seven eleven store," one token may be generated for each element of the lexicalized hypothesis totaling six words. This creates a token representation of a lexicalized hypothesis/result. In another example, normalization processing may generate pseudo-word tokens to include in a token representation. For example, a token of "7-11" is generated as an alternative to tokens representing the words "seven" and "eleven." In general, each lexicalized result can give rise to one or more alternative normalized results.

The normalization component 104 is configured to interface with the knowledge store 108 to improve normalization and scoring associated with normalization by accessing resources such as knowledge data of the knowledge store 108. In one example, the text normalization component 104 provides each normalized result with its own score and combines that score with a score for the lexicalized result from which the normalized result was formed to generate a final score for a normalized result. As an example, a score generated for one or more tokens created by the normalization is a probability that an alternative token representation is an accurate estimation of a received input. In alternative examples, normalized results or hypotheses can be assigned new scores based on application of a normalization model (e.g., large scale normalization language model such as BingLM or GoogleLM). As an example, a robust normalization model is combined with an acoustic score of a lexicalized result to generate a score for one or more tokens of a normalized hypothesis.

A confusion network creation component 106 interfaces with the normalization component 102 to receive data associated with normalized results for generation of token level confusion networks. The confusion network creation component 106 takes recognition results that have been normalized, aligns the recognition results and creates a token level confusion network. The confusion network creation component 106 generates a token-level confusion network for the normalized results. The confusion network is a sequence of ordered nodes where each pair of consecutive nodes is connected by at least one arc and the sum of probabilities of all arcs leaving one nodes sums up to one (1) or alternatively is associated with a percentage that adds up to one-hundred. Each arc of the confusion network is associated with a label (for a token of a normalized result) and a weight (probability/score). In forming the token-level confusion network, scores for hypotheses are propagated to individual arcs of the confusion network.

Knowledge store 108 interfaces with the confusion network creation component 106 to improve robustness for alignment of results and generation of confusion networks where the confusion network creation component 106 has access to resources such as knowledge data of the knowledge store 108. The confusion network creation component 106 may align normalized hypotheses/results based on analyzing similarities in parameters associated with one or more tokens of a normalized result. In some examples, alignment of normalized hypotheses/results is executed using dynamic programming. In one example, exhaustive dynamic programming is used to align the normalized hypotheses/results. In other examples, dynamic programming algorithms used are tailored for practical application of multiple sequence alignment (e.g., exact Multiple Sequence Alignment algorithm, star alignment algorithm, Carrillo Lipman algorithm, etc.).

In some examples, the confusion network creation component 106 modifies the created token confusion network, for example, into a multi-arc token confusion network. In examples, the confusion network creation component 106 re-aligns tokens of generated confusion network to transform a token-level confusion network into a multi-arc token-level confusion network. As an example, the confusion network creation component 106 re-aligns token representations of a normalized result based on a comparison of time information and grapho-phonetical information associated with a representation (e.g., token or tokens) of a normalized result. Grapho-phonetical information used is any information indicating a relationship between written symbols/letters and sounds associated with such symbols/letters. Examples of grapho-phonetical information include but are not limited to spelling (e.g., a spelling for "though" is similar to "tough"), pronunciation (e.g., "tough" is pronounced similar to "puff") and arrangement or sequence of letters in comparison with other tokens, among other examples. Although examples of time and grapho-phonetical factors are described, one skilled in the art will recognize that other parameters of elements or tokens of results can be used to perform alignment of lexicalized results and normalized results including discriminative or generative modeling.

The confusion network creation component 106 transforms the generated confusion network into a multi-arc confusion network where nodes remain as aligned before (in the confusion network) but the starting/ending points of individual arcs can be migrated to different nodes searching for the closest one in terms of time information. A traditional confusion network encodes possibilities for one-to-one corrections (e.g., an input of "nine" is represented as a token "9"); however many-to-many corrections (e.g., a token "928" as an alternative to individual elements of "9 20 8") are still non-trivial. Thus, a confusion network is improved by transforming the confusion network into a multi-arc confusion network. Transforming the confusion network into a multi-arc confusion network comprises realigning at least one token of the confusion network to span multiples arcs of the confusion network based on analyzing similarities in time information and grapho-phonetical information of the token associated with an arc of the confusion network. The resultant structure offers correction functionality as it makes clearer which alternatives are available for any selected node span. Accordingly, processing of user input is improved as alternative results/hypotheses can be more accurately identified and more efficiently returned to a user, for example, when a user identifies that it would like to receive an alternative to a sequence of several tokens presented to a user.

Figure 2:
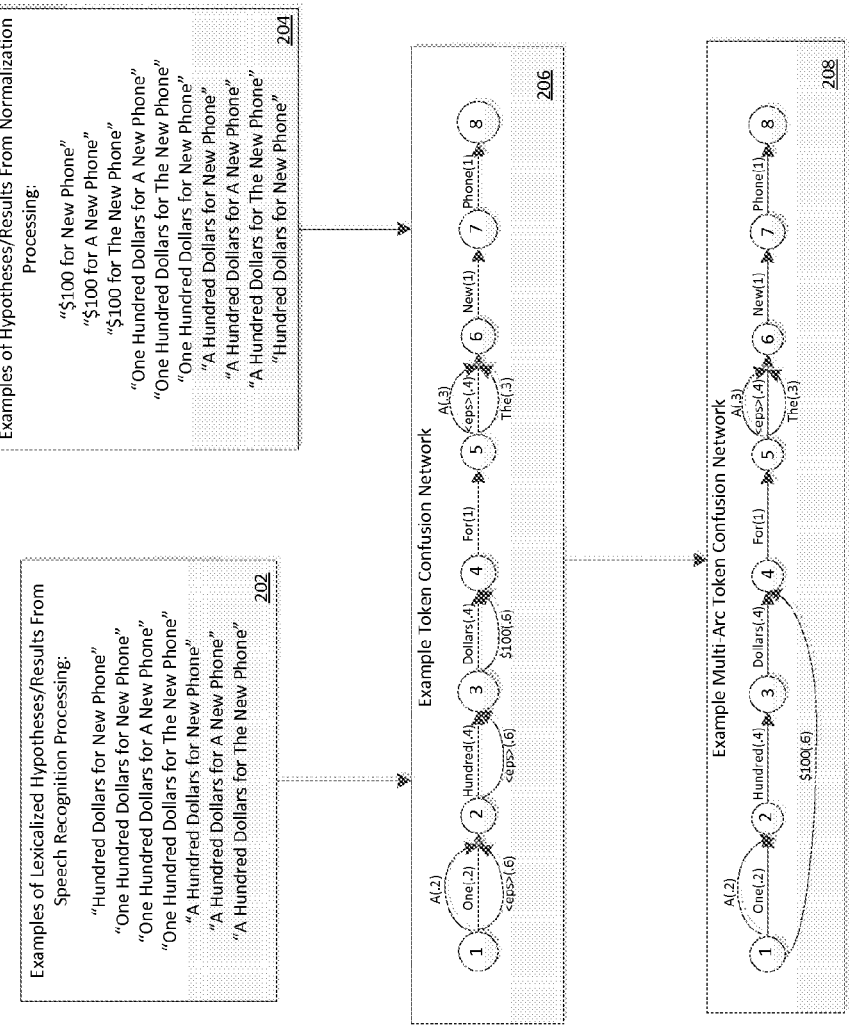
FIG. 2 illustrates an overview of example determinations by exemplary systems and applications.

FIG. 2 illustrates an overview of example determinations by exemplary systems and applications. Example systems can be system 100 as described in FIG. 1. FIG. 200 shows an example of results/hypotheses (block 202) output from speech recognition processing (e.g., by speech recognition component 102 as described in FIG. 1), results/hypotheses (block 204) output from normalization processing (e.g., by normalization component 104 as described in FIG. 1), an example token confusion network (block 206) and an example multi-arc token confusion network (block 208) output from confusion network creation processing (e.g., by confusion network creation component 106 as described in FIG. 1).

As shown in block 202, speech recognition processing can yield multiple results or hypotheses for a captured input. In block 202, examples of lexicalized hypotheses determined are shown. In some examples, a score may be associated with elements of the lexicalized hypotheses. Scoring of lexicalized hypotheses/results may be determined based on application of speech recognition language models. As an example, scoring of lexicalized hypotheses may comprise determination of an acoustic score or a language model score as described in the description of FIG. 1.

Proceeding to block 204, examples are shown of hypotheses/results from normalization processing of the lexicalized hypotheses/results. Normalization processing includes performing ITN or text normalization on the lexicalized hypotheses. The normalizing processing comprises generating one or more tokens for elements of each normalized hypothesis. In some examples, normalization processing performed identifies that an element of a lexicalized result/hypothesis does not require changing. In that case, normalization of an element of a lexicalized result keeps a same representation of a hypothesis as was generated by the speech recognition processing by creating one or more tokens are created for elements of the lexicalized hypothesis. For example, a normalized hypothesis creates a token representation for lexicalized hypotheses of "Hundred Dollars for New Phone" and "One Hundred Dollars For A New Phone." In addition, alternative normalized hypotheses such as "$100 for New Phone" and "$100 for A New Phone," are generated as shown in block 204. Furthermore, as described in FIG. 1, a score may be associated with tokens generated in the normalization processing. For instance, a score may be generated for a normalized result/hypothesis by applying at least one token-level language model to a normalized hypothesis to generate scores for one or more tokens of a normalized hypothesis. In another example, scoring for a normalized result/hypothesis is generated by rescoring an acoustic score for each of the lexicalized hypotheses to generate a score for each of the normalized hypotheses by applying a token language model to acoustic scores of the lexicalized hypotheses.

Confusion network creation processing creates a token-level confusion network for the normalized hypotheses as shown in block 206. In one example, creation of a token-level confusion network comprises aligning normalized hypotheses (or scored normalized results/hypotheses). In an example of aligning scored responses, the aligning performed by the confusion network creation processing is based on evaluation of parameters associated with tokens of normalized hypotheses. Arcs (between numbered nodes of block 206) of the generated confusion network have labels (e.g., representing tokens) and scores/weights (shown in parentheses for each arc of block 206, e.g., "(0.2)"). Arcs (e.g., "A", "one", "<eps>" as shown between nodes 1 and 2 of block 206) are labeled with tokens representing alternatives to elements of a hypothesis/result. As a note, epsilon (denoted as "<eps>" in block 206) is used to represent a connection between nodes that is null or represents no token.

Confusion network creation processing further transforms the token-level confusion network into a multi-arc token confusion network as shown in Block 208. Block 208 shows a visual representation of an exemplary multi-arc token confusion network. Block 208 is a transformation of the token confusion network shown in block 206 and includes an exemplary multi-arc alternative representative of a token (e.g., token of "$100" spans multiple arcs to offer an alternative to "one hundred dollars" or "a hundred dollars"). Thus, alternatives to tokens are readily identifiable for output when a system or service is programmed to output alternatives for tokens or a request for alternatives for tokens is made by a user.

Figure 3:
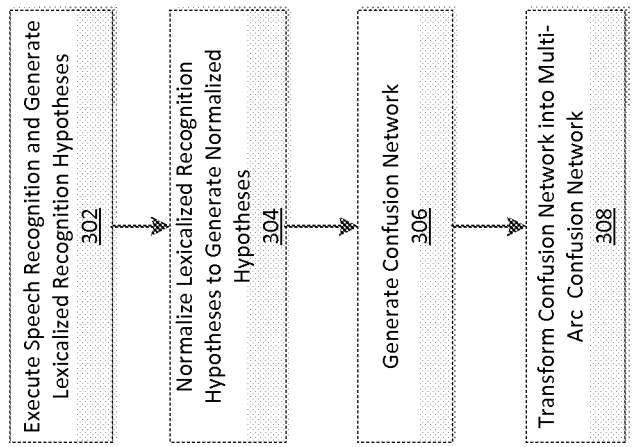
FIG. 3 illustrates an example method of generating an example confusion network and an example multi-arc word confusion network

FIG. 3 illustrates an example method 300 of generating an example confusion network and an example multi-arc word confusion network. FIG. 3 illustrates a method 300 of generating a token-level confusion network and a multi-arc token level confusion network. As an example, method 300 may be executed by an exemplary system such as system 100 described in FIG. 1. In other examples, method 300 may be executed on a device comprising at least one processor configured to store and execute operations, programs or instructions. However, method 300 is not limited to such examples. In other examples, method 300 may be operations performed by an input understanding application or service.

Flow begins at operation 302, where speech recognition is executed on a captured input. Input may be captured and processed by a speech recognition component or module such as the speech recognition component 102 described in FIG. 1. Lexicalized hypotheses (as described in FIG. 1) are generated based on processing of the captured input by a speech recognition component or module. A generated lexicalized hypothesis comprises one or more elements as described in the description of FIG. 1. An element is a unit associated with vocabulary such as a letter, symbol, character, word, etc. In some examples, generation of lexicalized hypotheses further comprises generating a score for each of the lexicalized hypotheses. As an example, an acoustic score and/or a language model score is generated for each of the lexicalized hypotheses.

Flow proceeds to operation 304 where lexicalized hypotheses are normalized by performing normalization processing. A normalized hypothesis (as described in FIG. 1) is a result of normalization of a lexicalized hypothesis and comprises one or more tokens as described in the description of FIG. 1. Normalization processing is performed in operation 304 to generate the normalized hypotheses based on the lexicalized hypotheses or elements of lexicalized hypotheses determined from speech recognition processing. In one example of normalization processing, token representations are generated for elements of a lexicalized hypothesis/result. In some examples of normalization processing, token representations are newly generated offering alternative representations (e.g., a token of "$1" may be an alternative for the word "dollar") to an element of a lexicalized hypothesis/result. Processing of operation 304 may further comprise generating a score for token representations of normalized hypotheses. In one example score generation performed in operation 304 comprises generating a final score for each of the normalized hypotheses based on a combination of the score for a lexicalized hypothesis and the score for a normalized hypothesis. In another example, scoring performed in operation 304 comprises rescoring the acoustic score for each of the lexicalized hypotheses to generate a score for each of the normalized hypotheses by applying a token language model (or adapted token language model) to acoustic scores of the lexicalized hypotheses. Scoring for hypotheses may be generated based on any statistical analysis of the lexicalized and/or normalized hypotheses.

From operation 304, flow proceeds to operation 306, where a confusion network is generated based on the normalization of lexicalized hypotheses. In one example each arc of the confusion network generated in operation 306 is a representation of a token of a normalized result. Exemplary confusion networks are referenced in FIGS. 1 and 2 and the accompanying description. Generation of the confusion network may comprise aligning tokens of normalized results. For instance, similarities in time information and grapho-phonetical information for tokens are analyzed to initially place arcs of a confusion network. Each arc of the generated confusion network is associated with a token and a weight (e.g., score/probability value). In at least one example, alignment of hypotheses is completed by dynamic programming approximation that identifies an optimal alignment solution based on evaluation of the time information and the grapho-phonetical information for tokens of the normalized results. In another example, aligning of tokens is executed using exact Multiple Sequence Alignment algorithms.

To improve a system or services ability to output alternatives to a user, flow proceeds to operation 308 where the confusion network is transformed into a multi-arc confusion network. As the dynamic programming approximates alignment of tokens, additional processing is performed to transform the confusion network into a multi-arc confusion network. The processing performed in operation 308 comprises realigning at least one token of the confusion network to span multiples arcs of the confusion network based on analyzing similarities in time information and grapho-phonetical information of tokens associated with arcs of the confusion network. Re-alignment performed in operation 308 comprises changing a starting point and an ending point for an arc associated with the token to span multiple arcs of alternative results/hypotheses.

Figure 4:
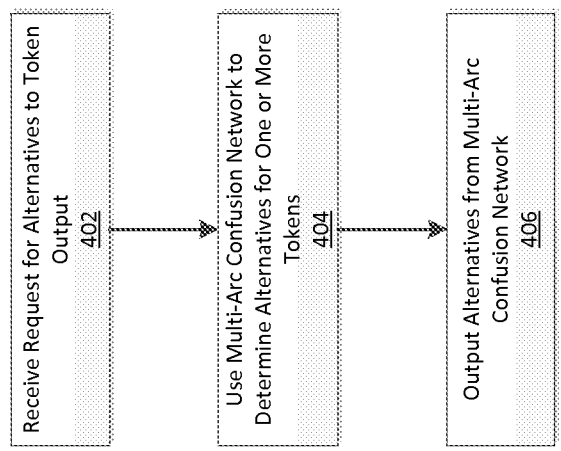
FIG. 4 illustrates an example method of outputting alternative token representations from an example multi-arc confusion network.

FIG. 4 illustrates an example method 400 of outputting alternative token representations from an example multi-arc confusion network. FIG. 4 illustrates a method 400 of using a multi-arc confusion network to provide alternative representations to a user. As an example, method 400 may be executed by an exemplary system such as system 100 of FIG. 1. In other examples, method 400 may be executed on a device comprising at least one processor configured to store and execute operations, programs or instructions. However, method 400 is not limited to such examples. In other examples, method 400 may be performed by an input understanding application or service.

Flow of method 400 begins at operation 402, where a request is received for alternatives in response to one or more tokens of a token representation presented to a user. For example, when results are returned to a user in response to a spoken utterance, the user may indicate that the output presented is not what the user was looking for or the user may request an alternative to a token presented in the output provided to the user. For instance, an output (e.g., token representation) of "Find the Closest Seven Eleven" may be presented to a user. A user may request alternatives for tokens of "seven" and "eleven."

Proceeding to operation 404, the multi-arc confusion network is used to determine alternatives for one or more tokens. In operation 404, the multi-arc confusion network is analyzed to identify an alternative token representation for tokens. As an example, a token representation of "7-11" may be identified from the multi-arc confusion network as being an alternative to the combination of the words "seven" and "eleven."

Flow proceeds to operation 406, where alternative token representations are output from the multi-arc confusion network. For example, an alternative representation identified from the multi-arc confusion network is output to a user. A processing device or service using a generated multi-arc confusion network may output one or more alternatives to a range of elements or tokens identified by a user of a processing device (e.g., mobile device) or service (e.g., application or program). For example, a user may request alternatives to one or more words of a hypothesis/result provided to a user.

At any point in time, a user may identify that a system or service incorrectly understood a received input and incorrectly interpreted a hypothesis/result. Processing for generation or modification of a confusion network may create a new confusion network and/or multi-arc confusion network or alternatively modify an existing confusion network based on additional feedback from a user.

Figure 5:
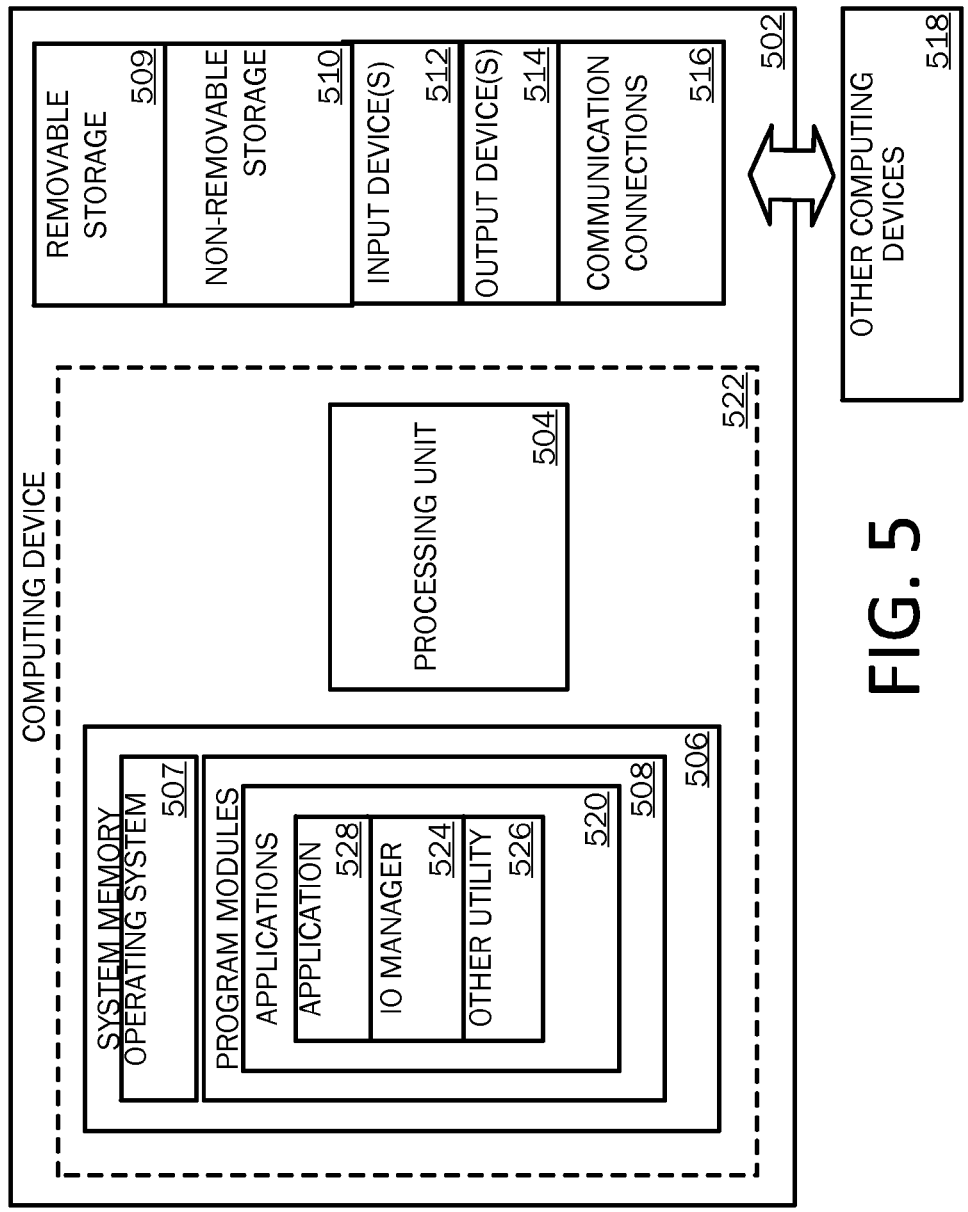
FIG. 5 is a block diagram illustrating an example of a computing device with which aspects of the present disclosure may be practiced.
Figure 6A:
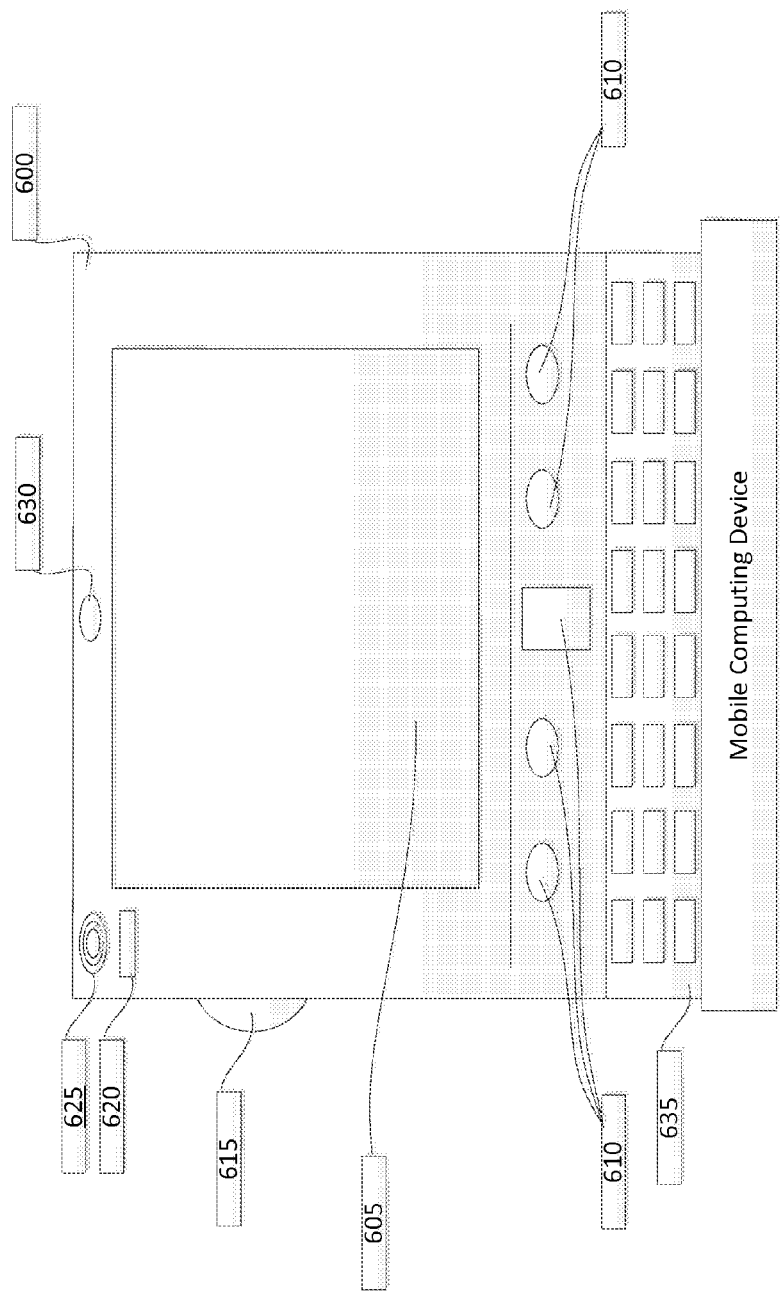
FIGS. 6A and 6B are simplified block diagrams of a mobile computing device with which aspects of the present disclosure may be practiced.
Figure 6B:
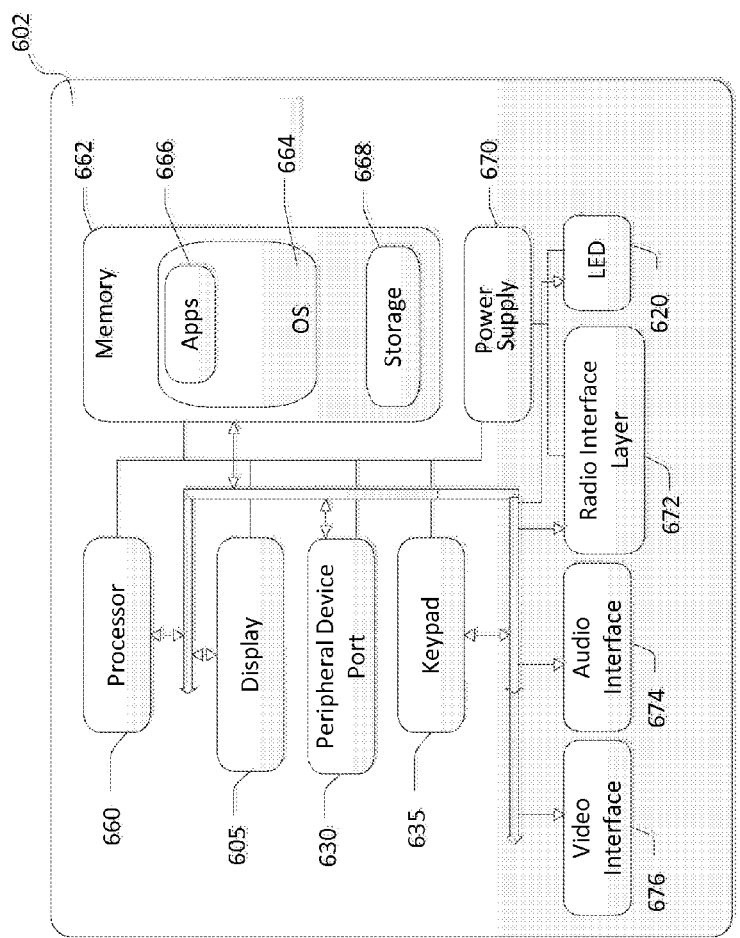
Figure 7:
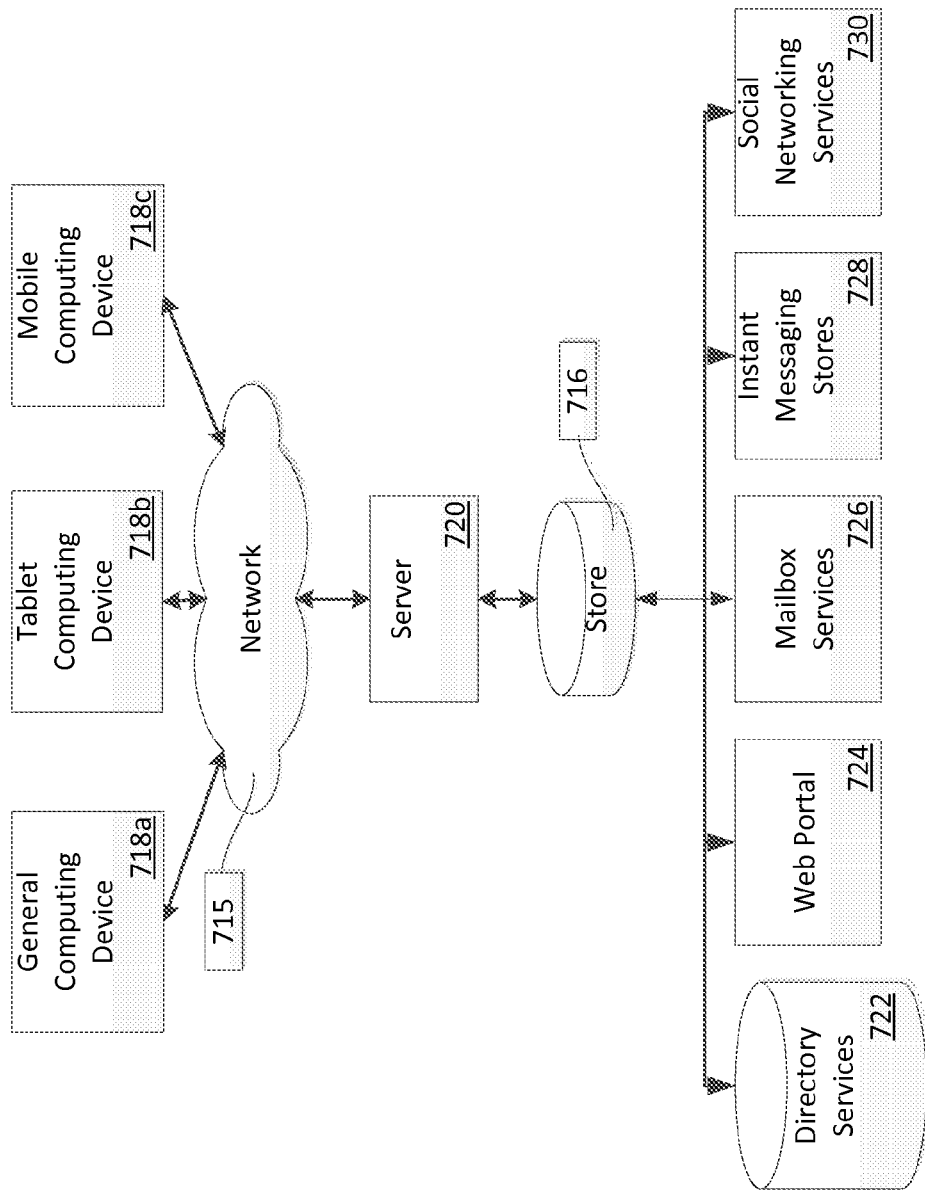
FIG. 7 is a simplified block diagram of a distributed computing system in which aspects of the present disclosure may be practiced.

FIGS. 5-7 and the associated descriptions provide a discussion of a variety of operating environments in which examples of the invention may be practiced. However, the devices and systems illustrated and discussed with respect to FIGS. 5-7 are for purposes of example and illustration and are not limiting of a vast number of computing device configurations that may be utilized for practicing examples of the invention, described herein.

FIG. 5 is a block diagram illustrating physical components of a computing device 502, for example a component of a system with which examples of the present disclosure may be practiced. The computing device components described below may be suitable for the computing devices described above. In a basic configuration, the computing device 502 may include at least one processing unit 504 and a system memory 506. Depending on the configuration and type of computing device, the system memory 506 may comprise, but is not limited to, volatile storage (e.g., random access memory), non-volatile storage (e.g., read-only memory), flash memory, or any combination of such memories. The system memory 506 may include an operating system 507 and one or more program modules 508 suitable for running software applications 520 such as application 528, IO manager 524, and other utility 526. As examples, system memory 506 may store instructions for execution. Other examples of system memory 506 may components such as a knowledge resource. The operating system 507, for example, may be suitable for controlling the operation of the computing device 502. Furthermore, examples of the invention may be practiced in conjunction with a graphics library, other operating systems, or any other application program and is not limited to any particular application or system. This basic configuration is illustrated in FIG. 5 by those components within a dashed line 522. The computing device 502 may have additional features or functionality. For example, the computing device 502 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 506. While executing on the processing unit 504, the program modules 508 (e.g., application 528, Input/Output (I/O) manager 524, and other utility 526) may perform processes including, but not limited to, one or more of the stages of the operational methods 300-400 illustrated in FIGS. 3 through 4, for example. Other program modules that may be used in accordance with examples of the present invention may include electronic mail and contacts applications, word processing applications, spreadsheet applications, database applications, slide presentation applications, input recognition applications, drawing or computer-aided application programs, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the computing device 502 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

The computing device 502 may also have one or more input device(s) 512 such as a keyboard, a mouse, a pen, a sound input device, a device for voice input/recognition, a touch input device, etc. The output device(s) 514 such as a display, speakers, a printer, etc. may also be included. The aforementioned devices are examples and others may be used. The computing device 504 may include one or more communication connections 516 allowing communications with other computing devices 518. Examples of suitable communication connections 516 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 506, the removable storage device 509, and the non-removable storage device 510 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 502. Any such computer storage media may be part of the computing device 502. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 6A and 6B illustrate a mobile computing device 600, for example, a mobile telephone, a smart phone, a personal data assistant, a tablet personal computer, a laptop computer, and the like, with which examples of the invention may be practiced. For example, mobile computing device 600 may be implemented as system 100, components of systems 100 may be configured to execute processing methods as described in FIGS. 3-4, among other examples. With reference to FIG. 6A, one example of a mobile computing device 600 for implementing the examples is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative examples, mobile computing device 600 may incorporate more or less input elements. For example, the display 605 may not be a touch screen in some examples. In yet another alternative example, the mobile computing device 600 is a portable phone system, such as a cellular phone. The mobile computing device 600 may also include an optional keypad 635. Optional keypad 635 may be a physical keypad or a "soft" keypad generated on the touch screen display. In various examples, the output elements include the display 605 for showing a graphical user interface (GUI), a visual indicator 620 (e.g., a light emitting diode), and/or an audio transducer 625 (e.g., a speaker). In some examples, the mobile computing device 600 incorporates a vibration transducer for providing the user with tactile feedback. In yet another example, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one example of a mobile computing device. That is, the mobile computing device 600 can incorporate a system (i.e., an architecture) 602 to implement some examples. In examples, the system 602 is implemented as a "smart phone" capable of running one or more applications (e.g., browser, e-mail, input processing, calendaring, contact managers, messaging clients, games, and media clients/players). In some examples, the system 602 is integrated as a computing device, such as an integrated personal digital assistant (PDA) and wireless phone.

One or more application programs 666 may be loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 666 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600, including application 528, IO manager 524, and other utility 526 described herein.

The system 602 has a power supply 670, which may be implemented as one or more batteries. The power supply 670 might further include an external power source, such as an AC adapter or a powered docking cradle that supplements or recharges the batteries.

The system 602 may include peripheral device port 678 that performs the function of facilitating connectivity between system 602 and one or more peripheral devices. Transmissions to and from the peripheral device port 672 are conducted under control of the operating system 664. In other words, communications received by the peripheral device port 678 may be disseminated to the application programs 666 via the operating system 664, and vice versa.

The system 602 may also include a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 666 via the operating system 664, and vice versa.

The visual indicator 620 may be used to provide visual notifications, and/or an audio interface 674 may be used for producing audible notifications via the audio transducer 625. In the illustrated example, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. In accordance with examples of the present invention, the microphone may also serve as an audio sensor to facilitate control of notifications, as will be described below. The system 602 may further include a video interface 676 that enables an operation of an on-board camera 630 to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 6B by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio 672 or via a distributed computing network. Similarly, such data/information may be readily transferred between computing devices for storage and use according to well-known data/information transfer and storage means, including electronic mail and collaborative data/information sharing systems.

FIG. 7 illustrates one example of the architecture of a system for providing an application that reliably accesses target data on a storage system and handles communication failures to one or more client devices, as described above. Target data accessed, interacted with, or edited in association with application 528, IO manager 524, other utility 526, and storage may be stored in different communication channels or other storage types. For example, various documents may be stored using a directory service 722, a web portal 724, a mailbox service 726, an instant messaging store 728, or a social networking site 730, application 528, IO manager 524, other utility 526, and storage systems may use any of these types of systems or the like for enabling data utilization, as described herein. A server 720 may provide storage system for use by a client operating on general computing device 502 and mobile device(s) 600 through network 715. By way of example, network 715 may comprise the Internet or any other type of local or wide area network, and client nodes may be implemented as a computing device 502 embodied in a personal computer, a tablet computing device, and/or by a mobile computing device 600 (e.g., a smart phone). Any of these examples of the client computing device 502 or 600 may obtain content from the store 716.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While example examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A computer-implemented method comprising:
   executing speech recognition on a captured input and generating lexicalized hypotheses from the captured input;
   normalizing the lexicalized hypotheses to generate normalized hypotheses for the lexicalized hypotheses, wherein a normalized hypothesis comprising one or more tokens;
   generating a confusion network comprising token representations of normalized hypotheses, wherein each arc of the confusion network represents a token of a normalized hypothesis; and
   transforming the generated confusion network into a multi-arc confusion network, wherein the transforming comprising realigning at least one token of the confusion network to span multiples arcs of the confusion network.

2. The computer-implemented method according to claim 1, wherein the realigning further comprises changing a starting point and an ending point for an arc associated with the token to span multiple arcs representing elements of a normalized hypothesis.

3. The computer-implemented method according to claim 1, wherein the generating of the confusion network further comprises aligning, using dynamic programming approximation, tokens of normalized hypotheses based on time information and grapho-phonetical information associated with tokens of the normalized hypotheses.

4. The computer-implemented method according to claim 3, wherein the aligning uses exact Multiple Sequence Alignment algorithms to perform alignment.

5. The computer-implemented method according to claim 1, wherein:
the generating of lexicalized hypotheses further comprises generating a score for each of the lexicalized hypotheses, and
the normalizing further comprises generating a score for each of the normalized hypotheses and generating a final score for representations of the normalized hypotheses based on a combination of the score for a lexicalized hypothesis and the score for a normalized hypothesis.

6. The computer-implemented method according to claim 1, wherein:
the generating of lexicalized hypotheses further comprises generating an acoustic score for each of the lexicalized hypotheses,
the generating of the normalized hypotheses further comprises rescoring the acoustic score for each of the lexicalized hypotheses to generate a score for each of the normalized hypotheses by applying a token language model to acoustic scores of the lexicalized hypotheses.

7. The computer-implemented method according to claim 1, further comprising:
receiving, from a user, request for an alternative to one or more tokens of a response presented to the user.

8. The computer-implemented method according to claim 7, further comprising:
outputting an alternative for one or more tokens based on evaluation of the multi-arc confusion network.

9. A system comprising:
a storage; and
at least one processor connected with the storage to execute operations comprising:
executing speech recognition on a captured input and generating lexicalized hypotheses from the captured input;
normalizing the lexicalized hypotheses to generate normalized hypotheses for the lexicalized hypotheses, wherein a normalized hypothesis comprising one or more tokens;
generating a confusion network for the normalized hypotheses, wherein each arc of the confusion network represents a token of a normalized hypothesis; and
transforming the generated confusion network into a multi-arc confusion network, wherein the transforming comprising realigning at least one token of the confusion network to span multiples arcs of the confusion network.

10. The system according to claim 9, wherein the realigning further comprises changing a starting point and an ending point for an arc associated with the token to span multiple arcs representing elements of a normalized hypothesis.

11. The system according to claim 9, wherein the generating of the confusion network further comprises aligning, using dynamic programming approximation, tokens of normalized hypotheses based on time information and grapho-phonetical information associated with tokens of the normalized hypotheses.

12. The system according to claim 11, wherein the aligning uses Multiple Sequence Alignment algorithms to perform alignment.

13. The system according to claim 9, wherein:
the generating of lexicalized hypotheses further comprises generating a score for each of the lexicalized hypotheses, and
the normalizing further comprises generating a score for each of the normalized hypotheses and generating a final score for each of the normalized hypotheses based on a combination of the score for a lexicalized hypothesis and the score for a normalized hypothesis.

14. The system according to claim 9, wherein:
the generating of lexicalized hypotheses further comprises generating an acoustic score for each of the lexicalized hypotheses, and
the generating of the normalized hypotheses further comprises rescoring the acoustic score for each of the lexicalized hypotheses to generate a score for each of the normalized hypotheses by applying a token language model to acoustic scores of the lexicalized hypotheses.

15. The system according to claim 9, further comprising:
receiving, from a user, request for an alternative to one or more tokens of a response presented to the user.

16. The system according to claim 15, further comprising:
outputting an alternative for one or more tokens based on evaluation of the multi-arc confusion network.

17. A computer-readable storage device containing instructions, that when executed on at least one processor, causing the processor to execute a process comprising:
generating a confusion network comprising token representations from normalization of lexicalized hypotheses, wherein each arc of the confusion network represents a token of a normalized hypothesis; and
transforming the confusion network into a multi-arc confusion network, wherein the transforming comprising realigning at least one token of the confusion network to span multiple arcs of the confusion network.

18. The computer-readable storage device according to claim 17, wherein when the instructions are executed on the at least one processor, the process further comprising:
scoring the token representations, wherein the generating aligns the scored token representations, and wherein scoring of the token representations is performed by at least one of:
applying at least one token-level language model to a lexicalized hypothesis to generate scores for one or more tokens of a normalized hypothesis, and
rescoring an acoustic score for the lexicalized hypothesis to generate a score for each of the normalized hypotheses by applying a token language model to the acoustic score of the lexicalized hypothesis.

19. The computer-readable storage device according to claim 17, wherein when the instructions are executed on the at least one processor, the process further comprising:
receiving, from a user, request for an alternative to one or more tokens of a response presented to the user.

20. The computer-readable storage device according to claim 19, wherein when the instructions are executed on the at least one processor, the process further comprising:

outputting an alternative for one or more tokens based on evaluation of the multi-arc confusion network.

\* \* \* \* \*